Feb. 4, 1958
K. J. GUHMAN
2,821,973
OIL AND VACUUM SEAL
Filed Jan. 10, 1955
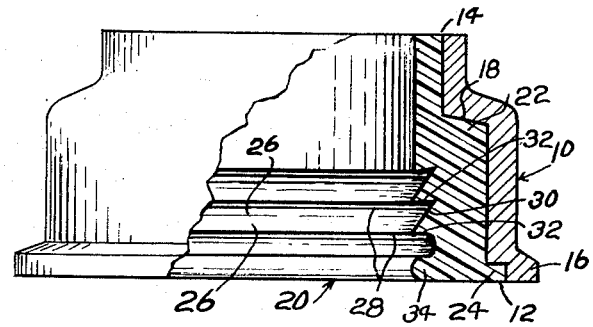
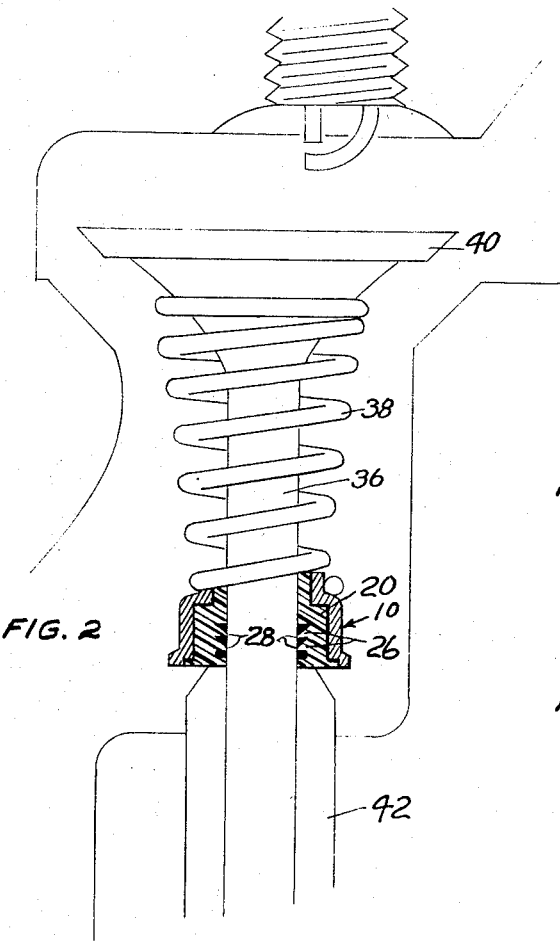
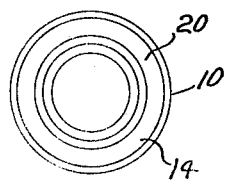
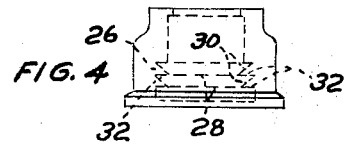
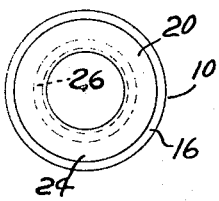
K. J. GUHMAN
INVENTOR.
BY Chas. R. Jay,
atty.

United States Patent Office 2,821,973
Patented Feb. 4, 1958

2,821,973
OIL AND VACUUM SEAL

Kenneth J. Guhman, Worcester, Mass.

Application January 10, 1955, Serial No. 480,677

4 Claims. (Cl. 123—188)

This invention relates to a new and improved oil and vacuum seal construction generally in the nature of a valve pack, and the principal object of the invention resides in the provision of an oil and vacuum seal which provides a positive seal both at atmospheric and operating pressures, so that no vacuum will be lost and there will be no oil leak as for instance in the combustion chamber of an internal combustion engine; and the provision of a seal as above described having a low coefficient of friction but a particularly high degree of sealing against oil and vacuum wherein the sealing material itself is non-porous, non-abrasive, and it retains its shape and size even under conditions of lateral motion of the valve stem or rod on which it is mounted.

Further objects of the invention include the provision of an oil and vacuum seal as described above comprising a one-piece molded rubbery sealing element located in and bonded to a metal cup and surrounding the rod or valve stem to be protected, said sealing element being provided with a series of internal inwardly directed ribs which taper inwardly to terminate in thin flexible edges, the same being located angularly with respect to the axis of the device to provide a firm scraping engagement with the rod or valve stem as it lifts, but on the other hand providing for extremely easy relative motion of the rod or valve stem in the opposite direction.

Other objects and advantages of the invention will appear hereinafter.

Reference is to be had to the accompanying drawings, in which

Fig. 1 is an enlarged view, partly in section, illustrating the new oil and vacuum seal;

Fig. 2 illustrates the same in a particular application thereof, the oil seal being in section;

Fig. 3 is a top plan view of the oil seal;

Fig. 4 is a side view thereof; and

Fig. 5 is a bottom plan view.

In carrying out the present invention, there is provided a cup generally indicated at 10 which is preferably made of metal. This cup has a wide open end 12 and a narrower open end 14, the former being provided with a lateral flange 16 and the latter with a reduced portion forming a shoulder 18.

The sealing element is generally indicated at 20 and it is molded of a rubbery material which has high sealing qualities but low friction such as rubber, plastic materials, and the like. This sealing element is bonded to the interior wall of the cup and is provided with a shoulder portion as at 22 to abut shoulder 18, and it also has a lateral flange 24 which abuts a smaller shoulder formed by flange 16.

The sealing element cannot easily be extracted under any conditions from the cup but it will be seen in Fig. 1 that pressure on the sealing element in an upward direction relative to the cup will completely fail to dislodge the sealing element under any circumstances due to the shoulder construction described.

Integrally molded with the sealing element, there are a series of internal inwardly directed lips 26, each of which is provided with a pair of surfaces forming a thin inner edge 28. This inner edge 28 is formed by the junction of a surface 30 which is inclined with respect to the axis of the device or any rod that extends through it, this surface also inclining downwardly and inwardly with respect to the larger end of the device.

The other wall or surface forming the thin edges 28 is indicated at 32 and in general this surface is at a right angle to the axis of the device or a rod therein.

There may also be provided an inwardly directed rim or flange 34 which may embrace the rod or stem in the device, but as will be explained below, the rib edges 28 perform the function of forming the oil and vacuum seal.

An installation of the device is shown in Fig. 2 wherein there is shown a valve stem 36 having a spring 38 and a head 40, the valve stem extending down into the guide 42. The lower end of spring 38 bears down upon the flange of the cup 10, forming the shoulder 18 and always holds the seal in place on the guide 42.

As the valve stem rises, the thin edges 28 perform a scraping action thereon but do not present any excess friction due to the flexibility and thinness of the ribs 26, and the fact that the rubbery material is specially prepared to have a low co-efficient of friction. The diameters of the edges 28 are made slightly smaller than the diameter of the valve stem, so that the oil seal is pre-loaded and will be seen to form a perfect seal which will not only stop oil losses but will also prevent loss of vacuum. The new oil seal is extremely long-lasting, it is non-abrasive, it is not porous and it retains its shape and size for long periods of time under hard usage.

Having thus described my invention and the advantages thereof, I do not wish to be limited to the details herein disclosed, otherwise than as set forth in the claims, but what I claim is:

1. An oil and vacuum seal for the valve stem of an internal combustion engine comprising a cup, a rubbery internally ribbed molded sealing element held in the cup, said sealing element having a generally cylindrical opening therethrough, the valve stem passing through the opening in the sealing element, the latter closely engaging the valve stem, a spring on the valve stem between the valve head and the cup to maintain the seal on the intake guide for the valve stem, the ribs of the seal being inset from the wall of the opening in the sealing element and in general inclined with respect to the valve stem axis, pointing away from the valve head toward the guide to scrape the stem on the stroke thereof from the guide, and to provide low friction stem motion in the opposite direction, said ribs being flexible and relatively sharp pointed on an annular line about the stem.

2. The seal of claim 1 wherein the ribs are generally triangular in section and two edge surfaces inclined relative to each other, one surface being inclined to the stem axis.

3. The seal of claim 1 wherein the ribs are generally triangular in section and two edge surfaces inclined relative to each other, one surface being inclined to the stem axis and the other rib edge surface being generally normal to the stem axis.

4. The seal of claim 1 wherein the ribs are generally triangular in section and two edge surfaces inclined relative to each other, one surface being inclined to the valve stem axis and the other rib edge surface being generally normal to the valve stem axis, the cup having a narrower end and a wider end, and the normal edge surfaces facing the wider end of the cup and the inclined edge surfaces facing the narrower end of the cup.

References Cited in the file of this patent

UNITED STATES PATENTS

| | | |
|---|---|---|
| 2,021,745 | Pfefferle et al. | Nov. 19, 1935 |
| 2,182,034 | Oberstadt | Dec. 5, 1939 |
| 2,207,400 | Gass | July 9, 1940 |
| 2,615,741 | Nathan | Oct. 28, 1952 |
| 2,643,147 | Funkhouser et al. | June 23, 1953 |